United States Patent [19]
Suzuki et al.

[11] Patent Number: 5,257,137
[45] Date of Patent: Oct. 26, 1993

[54] PHOTO-TAKING LENS FOR AN UNDERWATER CAMERA

[75] Inventors: Fumio Suzuki, Yokohama; Yoshinari Hamanishi, Wako, both of Japan

[73] Assignee: Nikon Corporation, Tokyo, Japan

[21] Appl. No.: 855,665

[22] Filed: Mar. 23, 1992

[30] Foreign Application Priority Data

Apr. 1, 1991 [JP] Japan .................................. 3-092626

[51] Int. Cl.$^5$ .......................... G02B 9/34; G02B 15/14
[52] U.S. Cl. ..................................... 359/771; 359/684; 359/686
[58] Field of Search ............... 359/684, 686, 754, 758, 359/762, 766, 773

[56] References Cited
U.S. PATENT DOCUMENTS 5,168,402 12/1992 Mihara .................................. 359/684

FOREIGN PATENT DOCUMENTS

0055915 5/1981 Japan .................................. 359/684
3-233420 10/1991 Japan .................................. 359/684

Primary Examiner—Bruce Y. Arnold
Assistant Examiner—James Phan
Attorney, Agent, or Firm—Shapiro and Shapiro

[57] ABSTRACT

A lens for an underwater camera is comprised of a first lens unit having no refractive power or having weak refractive power, a second lens unit comprising a forward unit having negative refractive power and a rearward unit having positive refractive power, and having weak refractive power, a third lens unit having positive refractive power, and a fourth lens unit having negative refractive power, the first lens unit being fixed relative to the image plane, the second lens unit and the third lens unit being axially moved together on the optical axis toward the object side relative to the fourth lens unit.

13 Claims, 2 Drawing Sheets

PHOTO-TAKING LENS FOR AN UNDERWATER CAMERA

BACKGROUND OF THE INVENTION

1. Field of the Invention

This invention relates to a water-proof type photo-taking lens for an underwater camera, and particularly to a photo-taking lens for an underwater camera having a high imaging performance over a photographing distance range from infinity to a close distance at which close-up photographing is possible under water.

2. Related Background Art

When close-up photographing is to be effected under water, use has heretofore been made of an underwater camera having mounted thereon a close-up photographing apparatus integrally provided with a close-up lens and a field frame corresponding to the photographing range by the close-up lens, or an underwater photographing apparatus having a microlens capable of close-up photographing on a single-lens reflex camera contained in a housing for underwater photographing.

However, in an underwater camera having mounted thereon a close-up photographing apparatus comprising a close-up lens and a field frame, not only accurate confirmation of the photographing range has been difficult, but also the photographing magnification has been not very high and the aberration correction of the lens has been insufficient. On the other hand, in an underwater photographing apparatus having a single-lens reflex camera contained in a housing for underwater photographing, various aberrations occur in a water-proof window provided in the front face of the housing, and this has led to the disadvantage that the imaging performance of the camera is reduced.

Also, in recent years, attempts have been made to make an underwater camera into a single-lens reflex camera by making the most of the advantages of a single-lens reflex camera which is easy to focus and moreover is free of parallax even in close-up photographing. However, there is not yet known a photo-taking lens which is well corrected in aberrations for underwater use and suitable for use for close-up photographing.

SUMMARY OF THE INVENTION

In order to solve the above-noted problems, the present invention has as an object thereof the provision of a lens for an underwater camera which is capable of photographing over a wide range from infinity to a close distance of the order of one-to-one magnification under water and which has a high imaging performance and can be focused by a simple lens moving mechanism.

To achieve the above object, a photo-taking lens for an underwater camera according to the present invention includes, in succession from the object side, a first lens unit having no refractive power or having weak positive or negative refractive power and fixed relative to the image plane, a second lens unit comprising a forward unit having negative refractive power and a rearward unit having positive refractive power, and having weak positive or negative refractive power as a whole, a third lens unit having positive refractive power, and a fourth lens unit having negative refractive power, the second lens unit and the third lens unit being designed to be moved together along the optical axis for the focusing from infinity to a close distance so that the on-axis air space between the first lens unit and the second lens unit is reduced and the on-axis air space between the third lens unit and the fourth lens unit is enlarged.

By the above-described construction, the photo-taking lens for an underwater camera according to the present invention has a high imaging performance and becomes capable of photographing over a very wide distance range from infinity to a close distance of the order of one-to-one magnification under water and moreover can be easily focused by a simple lens moving mechanism.

To sufficiently correct the aberrations of off-axial light rays caused by the first lens unit when the object field medium is water, it is desirable to design the photo-taking lens so as to satisfy the following conditions:

$$-1 < f_{2F}/f < -0.6,\ 0.6 < f_{23}/f < 1,$$

where
$f_{2F}$: the focal length of the forward unit in the second lens unit,
$f_{23}$: the combined focal length of the second lens unit and the third lens unit,
$f$: the rearward side focal length of the entire system during infinity focusing when the object field medium is water.

Further, to make the lens system compact and yet obtain a good imaging performance, it is desirable to design the photo-taking lens so as to satisfy the following condition:

$$0.3 < d/f_{23} < 2.0,$$

where
d : the on-axis air space between the first lens unit and the second lens unit in an infinity focused state.

Other objects, features and effects of the present invention will become fully apparent from the following detailed description taken in conjunction with the accompanying drawings.

DETAILED DESCRIPTION OF THE PREFERRED EMBODIMENTS

Some embodiments of the present invention will hereinafter be described in detail with reference to the accompanying drawings.

The photo-taking lens for an underwater camera according to the present invention, as shown in FIGS. 1 to 4, includes, in succession from the object side, a first lens unit G1 having a water-proof function, a second lens unit G2 comprising a forward unit G2F and a rearward unit G2R and having weak refractive power, a third lens unit G3 having positive refractive power, and a fourth lens unit G4 having negative refractive power. the first lens unit G1 being fixed relative to the image plane, and is designed such that the second lens unit G2 and the third lens unit G3 are axially moved together on the optical axis relative to the fourth lens unit G4, thereby effecting the focusing operation from infinity to a close distance.

Each lens unit of the lens of each embodiment will be described in greater detail.

The first lens unit G1 nearest to the object side is fixed relative to the image plane and has the function of a pressure-resistant water-proof window. This first lens unit has no refractive power, or has weak positive or negative refractive power. The reason is that since the amounts of axial movement of the second lens unit G2 and third lens unit G3 which are a focusing unit are relatively great, the aberration fluctuation by focusing, particularly the aberration fluctuation of the most marginal ray (hereinafter referred to as the R and ray) occurring from the object point on the optical axis, will become great if the first lens unit G1 has strong refractive power. In other words, the reason is that if the first lens unit G1 has strong refractive power, the incidence position of the R and ray entering the second lens unit G2 will greatly change with the movement by focusing, whereby the aberration fluctuation during focusing will become great.

The second lens unit G2 comprises a forward unit G2F having negative refractive power and a rearward unit G2R having positive refractive power, and has weak positive or negative refractive power as a whole.

It is for the following reason that the forward unit G2F in the second lens unit G2 has negative refractive power. As previously described, the first lens unit G1 does not have strong refractive power to avoid the aberration fluctuation of the R and ray becoming great, but when the object side is water, the off-axial light ray which has entered from outside the optical axis in the first lens unit G1 is strongly refracted toward the optical axis side and therefore, great positive distortion and chromatic difference of magnification occur. These aberrations can be mitigated by the construction of the first lens unit G1, but to correct these aberrations completely, the construction will become complicated and it will become difficult to achieve compactness. So, in the present invention, the forward unit G2F in the second lens unit G2 is endowed with negative refractive power, whereby good correction of the aberrations of the off-axial light ray caused by the first lens G1, particularly positive distortion and chromatic difference of magnification, is made possible.

The rearward unit G2R in the second lens unit G2 has positive refractive power, and has the function of correcting positive spherical aberration occurring in the forward unit G2F. Also, this rearward unit G2R having positive refractive power, with the forward unit G2F having negative refractive power, basically constitutes the second lens unit G2 and therefore, the second lens unit G2 as a whole has weak positive or negative refractive power.

The third lens unit G3 has positive refractive power and bears much of the refractive power of the entire lens system. The fourth lens unit G4 has negative refractive power, secures a positive magnification sufficiently and has the function of making the amount of movement of the focusing unit G2, G3 small and suppressing the aberration fluctuation by focusing.

On the basis of the above-described lens construction, with the second lens unit G2 having weak positive or negative refractive power, the third lens unit G3 is axially moved toward the object side along the optical axis relative to the fourth lens unit G4, whereby an excellent imaging performance can be maintained and yet focusing to infinity to a close distance can be accomplished.

Further, according to the focusing system of the present invention, it has become possible in principle to endow the lens system with the effective function of reducing the amounts of integral axial movement of the second lens unit G2 and the third lens unit G3 during focusing relative to the fourth lens unit G4.

Furthermore, to perform sufficient aberration correction, it is desirable that the following various conditions be satisfied on the basis of the above-described basic lens construction of the present invention.

Firstly, it is desirable that the relation between the focal lengths of the second and third lens units satisfy the conditions of the following expressions (1) and (2):

$$-1 < f_{2F}/f < -0.6 \quad (1)$$

$$0.6 < f_{23}/f < 1, \quad (2)$$

where
- $f$ : the rearward focal length of the entire system during infinity focusing when the object field medium is water,
- $f_{2F}$ : the focal length of the forward unit G2F in the second lens unit,
- $f_{23}$ : the combined focal length of the second lens unit G2 and the third lens unit G3.

The condition of expression (1) prescribes the optimal refractive power of the forward unit G2F in the second lens unit G2 relative to the rearward focal length of the entire system. This is a condition for correcting the aberrations of the off-axial ray occurring from the first lens unit G1, particularly distortion and chromatic difference of magnification, when the object field medium is water.

When the condition of expression (1) exceeds its upper limit, the refractive power of the forward unit G2F in the second lens unit G2 will become excessively strong, and the burden of the rearward unit G2R in the second lens unit G2 for the R and ray will become excessively great and the correction of spherical aberration will become difficult. When the condition of expression (1) exceeds its lower limit, the refractive power of the forward unit G2F in the second lens unit G2 will become weak and the correction of positive distortion and chromatic difference of magnification will become difficult.

The condition of expression (2) prescribes the optimal combined focal length of the second lens unit G2 and third lens unit G3 as the focusing unit. This is a condition for reducing the amounts of axial movement of the second lens unit G2 and third lens unit G3 axially moved together during focusing and making the entire lens compact.

When the condition of expression (2) exceeds its upper limit, the combined refractive power of the second lens unit G2 and third lens unit G3 as the focusing unit will become small. Therefore, the amount of axial movement of the focusing unit G2, G3 during focusing cannot be made small and it will become difficult to make the entire lens compact. Also, when the condition of expression (2) exceeds its lower limit, the combined refractive power of the second lens unit G2 and the third lens unit G3 as the focusing unit will become great. Therefore, the burden of the fourth lens unit G4 in aberration correction will become excessively great and it will become difficult to suppress the fluctuations of aberrations particularly the fluctuations of spherical aberration and coma, during focusing.

Furthermore, in the lens system of the present invention, to achieve compactness and yet obtain a better imaging performance from infinity to a close distance, it is desirable that the following condition be satisfied:

$$0.3 < d/f_{23} < 2.0 \quad (3)$$

where
- d : the on-axis air space between the first lens unit G1 and the second lens unit G2 in an infinity focused state,
- $f_{23}$ : the combined focal length of the second lens unit G2 and the third lens unit G3.

The condition of expression (3) prescribes the optimal on-axis air space between the first lens unit G1 and the second lens unit G2 in the infinity focused state, relative to the combined focal length $f_{23}$ of the second lens unit G2 and third lens unit G3.

When the condition of expression (3) exceeds its upper limit, the air space between the first lens unit G1 and the second lens unit G2 will become large and it will become difficult to make the entire lens system compact. Also, when the combined focal length $f_{23}$ of the second lens unit G2 and third lens unit G3 as the focusing unit becomes short and the refractive power of the focusing unit G2, G3 becomes strong, the burden of the fourth lens unit G4 in aberration correction will become great and as a result, aberration fluctuation resulting from focusing will become very great.

When conversely, the condition of expression (3) exceeds its lower limit, the air space between the first lens unit G1 and the second lens unit G2 will become small and the movement distance of the focusing unit G2, G3 when focused to the closest distance cannot be secured sufficiently. Also, when the combined focal length $f_{23}$ of the second lens unit G2 and third lens unit G3 as the focusing unit becomes long and the refractive power of the focusing unit becomes weak, the movement distance of the second lens unit G2 and third lens unit G3 as the focusing unit will become great and they may mechanically interfere.

Further, to achieve more sufficient aberration correction, it is desirable that the condition of the following expression (4) be satisfied:

$$-0.7 < f/f_2 < 0.2, \quad (4)$$

where
- f : the rearward focal length of the entire system during infinity focusing when the object field medium is water,
- $f_2$ : the focal length of the second lens unit G2.

The condition of expression (4) prescribes the optimal refractive power of the second lens unit G2 relative to the rearward focal length f of the entire system.

When the condition of expression (4) exceeds its upper limit and the second lens unit G2 has strong positive refractive power, the burden of the positive refractive power of the rearward unit G2R in the second lens unit G2 will become excessively great because the forward unit G2F in the second lens unit G2 has negative refractive power, and great coma flare will occur and the correction thereof will become difficult. Also, when the condition of expression (4) exceeds its lower limit and the second lens unit G2 has negative strong refractive power, the burden of the positive refractive power of the third lens unit G3 immediately behind it will become excessively great. As a result, the correction of zonal spherical aberration will become difficult.

Further, to achieve the compactness of the forward unit G2F in the second lens unit G2, it is desirable that this forward unit G2F be comprised of a negative lens L2F, and in such case, it is desirable that the conditions of the following expressions (5) and (6) be further satisfied:

$$-3 < q_{2F} < -1 \quad (5)$$

$$1.65 < n_{2F}, \quad (6)$$

where
- $q_{2F}$ : the shape factor of the negative lens L2F in the forward unit,
- $q_{2F} = (r_2 + r_1)/(r_2 - r_1)$
- $r_1$ : the radius of curvature of the object side of the negative lens L2F in the forward unit,
- $r_2$ the radius of curvature of the image side of the negative lens L2F in the forward unit.
- $n_{2F}$ : the refractive index of the negative lens L2F in the forward unit.

The conditions of expressions (5) and (6) prescribe the optimal lens shape and optimal refractive index of the negative lens L2F for extracting the aberration correction effect of the forward unit G2F in the second lens unit G2 to its maximum when the forward unit G2F in the second lens unit G2 is comprised of a negative lens.

When the condition of expression (5) exceeds its upper limit, positive distortion and chromatic difference of magnification occurring in the first lens unit G1 will be excessively corrected, and this is not preferable. When the condition of expression (5) exceeds its lower limit, the curvature of each surface of the negative lens L2F will become sharp and the correction of negative spherical aberration and coma will become difficult.

Also, when the condition of expression (6) is not satisfied, the curvature of each surface of the negative lens L2F will become sharp and the correction of spherical aberration and coma will become difficult.

Further, it is desirable that the focal length $f_1$ of the first lens unit G1 satisfy the condition of the following expression (7) relative to the rearward focal length f of the entire system during infinity focusing when the object field medium is water.

$$-0.25 < f/f_1 < 0.25, \quad (7)$$

where
- $f_1$ : the focal length of the first lens unit G1 when the object field medium is water.

The condition of expression (7) prescribes the focal length $f_1$ of the first lens unit G1 relative to the rearward focal length f of the entire system.

When the first lens unit G1 has strong positive refractive power beyond the upper limit of the condition of expression (7), very great positive distortion and chromatic difference of magnification will occur and it will become difficult to correct these in each lens more adjacent to the image side than the second lens unit G2. Also, when the first lens unit G1 has strong negative refractive power beyond the lower limit of the condition of expression (7), the R and ray will excessively diverge in the first lens unit G1 and the change in the passage position of the R and ray in the focusing unit G2, G3 by focusing will become great. Thus, it will become difficult to suppress the fluctuations of aberrations, particularly fluctuations of spherical aberration and coma.

[Embodiments]

Embodiments of the present invention will now be described with reference to FIGS. 1, 2, 3 and 4.

Each of a first embodiment, a second embodiment and a third embodiment is a lens for an underwater camera capable of close-up photographing of F number of the order of 2.8 and rearward focal length of the order of 50 mm under water, and a fourth embodiment is a lens for an underwater camera capable of close-up photographing of F number of the order of 2.8 and rearward focal length of the order of 100 mm.

Figure 1:
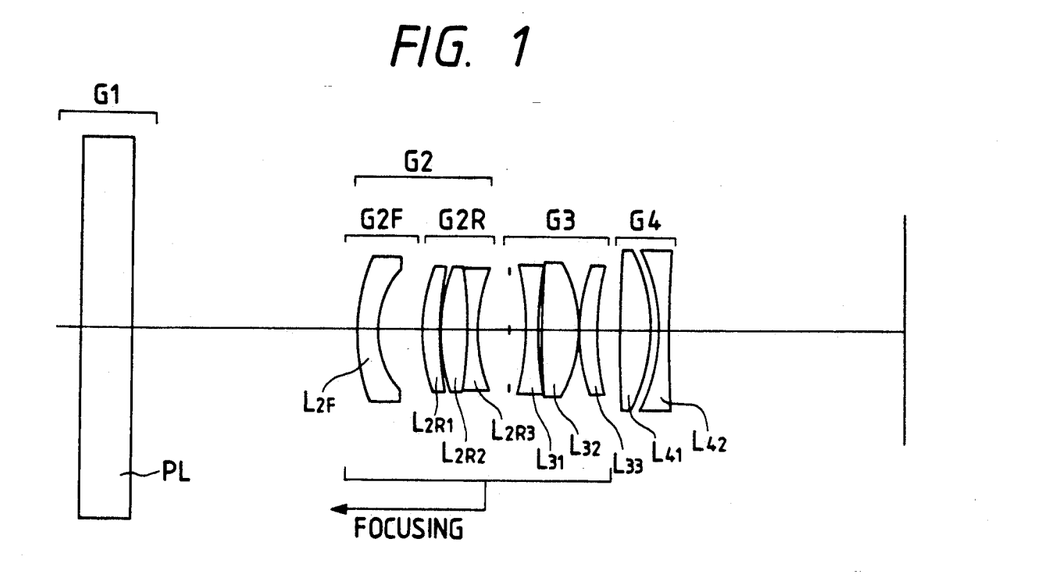
FIG. 1 is a lens construction view showing the lens arrangement in the infinity focused condition of a first embodiment of the present invention.
Figure 2:
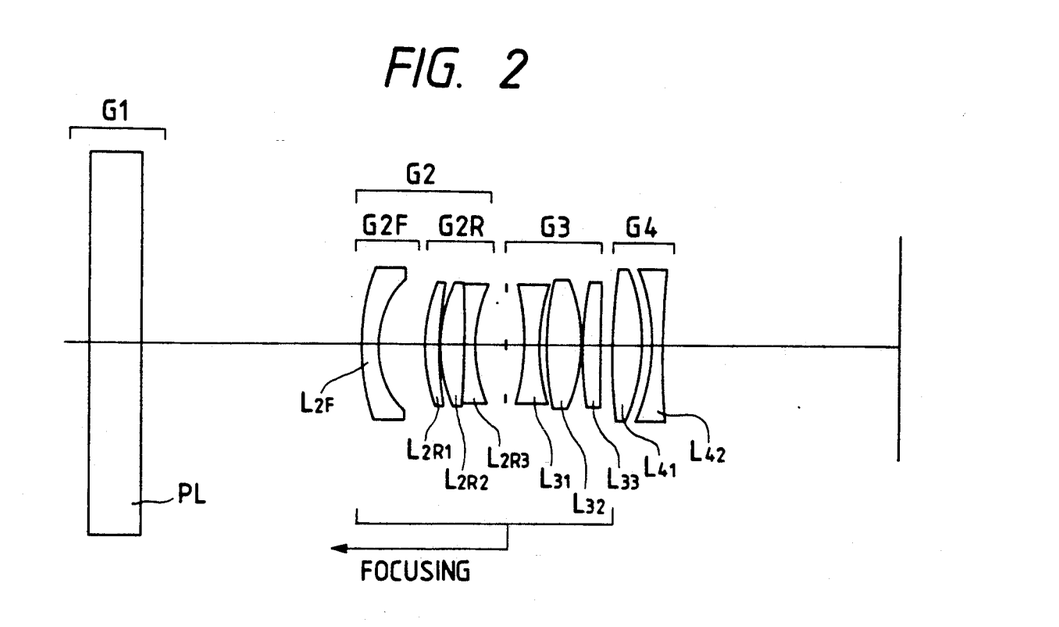
FIG. 2 is a lens construction view showing the lens arrangement in the infinity focused state of a second embodiment of the present invention.
Figure 3:
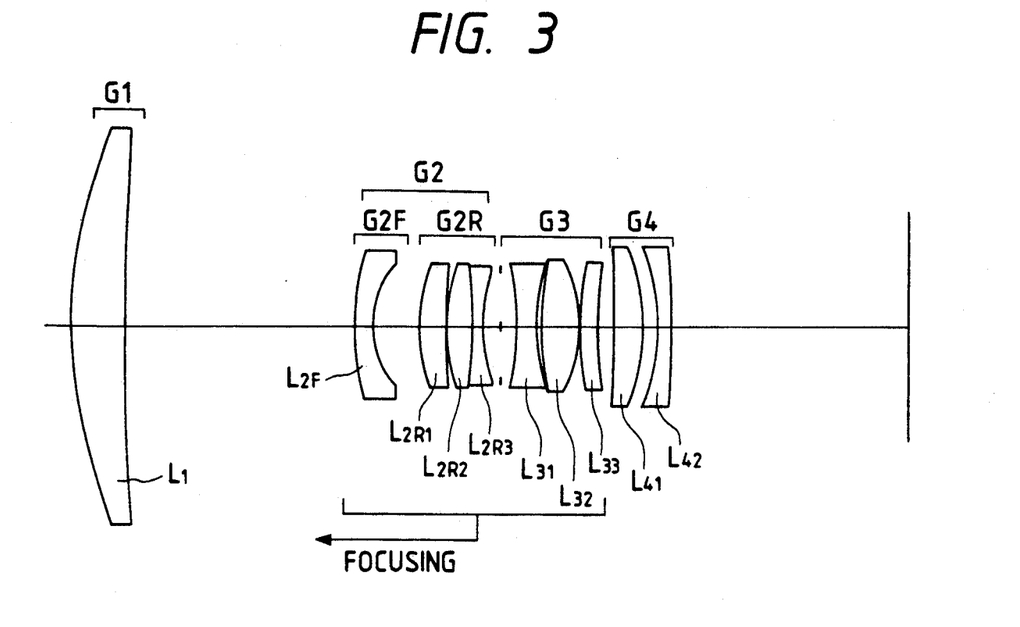
FIG. 3 is a lens construction view showing the lens arrangement in the infinity focused state of a third embodiment of the present invention.
Figure 4:
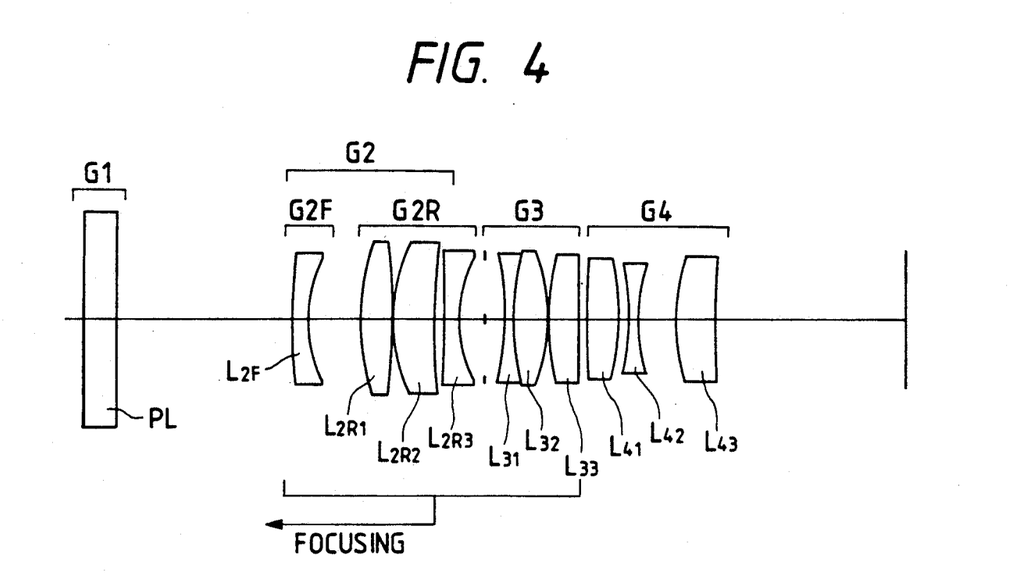
FIG. 4 is a lens construction view showing the lens arrangement in the infinity focused state of a fourth embodiment of the present invention.

FIG. 1 shows the lens construction of the first embodiment during infinity focusing, FIG. 2 shows the lens construction of the second embodiment during infinity focusing, FIG. 3 shows the lens construction of the third embodiment during infinity focusing, and FIG. 4 shows the lens construction of the fourth embodiment during infinity focusing.

The photo-taking lens for an underwater camera according to the present invention, as shown in the lens construction view of each embodiment, has a first lens unit G1 having no refractive power or having weak refractive power, a second lens unit G2 having weak refractive power, and a third lens unit G3 having positive refractive power, and a fourth lens unit G4 having negative refractive power, the second lens unit G2 having a forward unit G2F having negative refractive power and a rearward unit G2R having positive refractive power, the second lens unit G2 and the third lens unit G3 being designed to be moved together toward the object side relative to the fourth lens unit G4 during focusing from infinity to a close distance, whereby it is made possible in principle to secure an excellent imaging performance from infinity to the close distance underwater.

Describing the specific construction of each lens unit of the first and second embodiments of the present invention shown in FIGS. 1 and 2, respectively, the first lens unit G1 is comprised of a transparent parallel flat plate PL having no refractive power. The forward unit G2F in the second lens unit G2 is comprised of a negative meniscus lens L2F having its convex surface facing the object side, and the rearward unit G2R in the second lens unit G2 is comprised of a positive meniscus lens L2R1 having its convex surface facing the object side, a biconvex positive lens L2R2 and a biconcave negative lens L2R3 cemented thereto. The third lens unit G3 is comprised of a biconcave negative lens L31, a positive lens L32 and a positive meniscus lens L33 having its convex surface facing the object side, and the fourth lens unit G4 is comprised of a positive lens L41 having its surface of sharper curvature facing the image side, and a negative lens L42 having its surface of sharper curvature facing the object side.

In the first and second embodiments described above and the fourth embodiment which will be described later, the first lens unit G1 is provided by the parallel flat plate PL having no refractive power, and this has the function of refracting the off-axial ray without refracting the on-axial ray.

In the third embodiment shown in FIG. 3, the second lens unit G2 to the fourth lens unit G4 have lens constructions similar to those of the above-described first and second embodiments, but the first lens unit G1 is comprised of a positive meniscus lens L1 having its convex surface facing the object side. Thus, the first lens unit G1 has weak positive refractive power when the object field medium is water. It is also possible to construct the first lens unit G1 so as to have negative refractive power within the range of conditional expression (7).

In the fourth embodiment shown in FIG. 4, the first lens unit G1 is comprised of a parallel flat plate PL, the forward unit G2F in the second lens unit G2 is comprised of a negative meniscus lens L2F having its convex surface facing the object side, and the rearward unit G2R in the second lens unit G2 is comprised of a biconvex positive lens L2R1, a positive meniscus lens L2R2 having its convex surface facing the object side, and a negative lens L2R3 having its concave surface of sharper curvature facing the image side.

The third lens unit G3 is comprised of a biconcave negative lens 131, a positive lens L32 cemented thereto and a positive meniscus lens L33 having its convex surface facing the object side, and the fourth lens unit G4 is comprised of a positive lens L41, a biconcave negative lens L42 and a positive meniscus lens L43 having its surface of sharper curvature facing the object side.

In each of the above-described embodiments, the focusing from infinity to a close distance is accomplished by the second lens unit G2 and the third lens unit G3 being moved together in the axial direction thereof relative to the image plane.

In each embodiment, the forward unit G2F in the second lens unit G2 is comprised of a negative lens L2F, but alternatively, it may be comprised of two or more negative lenses, or one or more negative lenses and one or more positive lenses. In such case, the conditions of the aforementioned expressions (5) and (6) need not always be satisfied.

Also, the fourth lens unit G4, in the first, second and third embodiments, is comprised of two lenses L41 and L42, and in the fourth embodiment, is comprised of three lenses L41, L42 and L43, and both of them have negative composite refractive power. In the first, second and third embodiments, the fourth lens unit G4 is comprised of positive and negative lenses in succession from the object side, but alternatively, may be comprised of negative and positive lenses.

The numerical data of the respective embodiments will be shown in Tables 1 to 4 below.

In these tables, the numbers at the left end represent the order from the object side, r represents the radius of curvature of each lens surface, d represents the spacing between adjacent lens surfaces, $\nu$ represents Abbe number, n represents the refractive index for d line ($\lambda = 587.6$ nm, f represents the focal length of the entire system, DO represents the distance from the object to be photographed to the first surface of the lens, and represents the short distance photographing magnification.

TABLE 1

(First Embodiment)

| No | r | d | $\nu$ | n |
|---|---|---|---|---|
| 1 | ∞ | 10.00 | 64.1 | 1.51680 |
| 2 | ∞ | (d$_2$) | | |

TABLE 1-continued (First Embodiment)

| | | | | |
|---|---|---|---|---|
| 3 | 35.336 | 3.50 | 46.8 | 1.76684 |
| 4 | 17.014 | 9.00 | | |
| 5 | 31.805 | 3.50 | 25.4 | 1.80518 |
| 6 | 71.705 | 0.10 | | |
| 7 | 36.369 | 5.00 | 45.4 | 1.79668 |
| 8 | −72.941 | 2.00 | 29.5 | 1.71736 |
| 9 | 32.415 | 8.84 | | |
| 10 | −55.010 | 2.50 | 23.0 | 1.86074 |
| 11 | 71.364 | 0.70 | | |
| 12 | 222.194 | 7.30 | 45.4 | 1.79668 |
| 13 | −24.641 | 0.10 | | |
| 14 | 35.473 | 3.50 | 40.9 | 1.79631 |
| 15 | 55.180 | ($d_{15}$) | | |
| 16 | 259.906 | 6.00 | 40.3 | 1.60717 |
| 17 | −33.230 | 1.70 | | |
| 18 | −31.796 | 2.00 | 45.4 | 1.79668 |
| 19 | 664.600 | (Bf) | | |

| | f = 51.6000 | β = −0.5000 | β = −1.0000 |
|---|---|---|---|
| D0 | ∞ | 108.4613 | 64.7658 |
| $d_2$ | 43.0605 | 24.2389 | 5.4172 |
| $d_{15}$ | 4.4407 | 23.2623 | 42.0840 |
| Bf | 45.0470 | 45.0470 | 45.0470 |

TABLE 2

(Second Embodiment)

| No | r | d | ν | n |
|---|---|---|---|---|
| 1 | ∞ | 8.00 | 64.1 | 1.51680 |
| 2 | ∞ | ($d_2$) | | |
| 3 | 43.499 | 3.00 | 46.8 | 1.76684 |
| 4 | 18.717 | 9.00 | | |
| 5 | 33.011 | 3.00 | 31.6 | 1.75692 |
| 6 | 98.598 | .10 | | |
| 7 | 30.127 | 4.50 | 45.4 | 1.79668 |
| 8 | −300.000 | 2.00 | 33.7 | 1.64831 |
| 9 | 27.511 | 9.49 | | |
| 10 | −47.134 | 3.00 | 25.4 | 1.80518 |
| 11 | 39.212 | 1.20 | | |
| 12 | 54.978 | 7.00 | 45.4 | 1.79668 |
| 13 | −28.357 | 0.10 | | |
| 14 | 74.480 | 3.50 | 49.4 | 1.77279 |
| 15 | 416.366 | ($d_{15}$) | | |
| 16 | 120.000 | 5.50 | 38.0 | 1.60342 |
| 17 | −39.037 | 2.00 | | |
| 18 | −36.689 | 2.00 | 45.4 | 1.79668 |
| 19 | 171.930 | (Bf) | | |

| | f = 51.6000 | β = −0.5000 | β = −1.0000 |
|---|---|---|---|
| D0 | ∞ | 112.0831 | 69.1333 |
| $d_2$ | 42.6244 | 23.2434 | 3.8624 |
| $d_{15}$ | 2.3912 | 21.7722 | 41.1532 |
| Bf | 45.8116 | 45.8116 | 45.8116 |

TABLE 3

(Third Embodiment)

| No | r | d | ν | n |
|---|---|---|---|---|
| 1 | 95.000 | 10.00 | 64.1 | 1.51680 |
| 2 | 546.202 | ($d_2$) | | |
| 3 | 45.280 | 3.50 | 46.8 | 1.76684 |
| 4 | 17.283 | 9.20 | | |
| 5 | 31.900 | 5.00 | 25.4 | 1.80518 |
| 6 | 135.668 | 0.10 | | |
| 7 | 35.200 | 4.80 | 49.4 | 1.77279 |
| 8 | −100.000 | 2.00 | 28.3 | 1.72825 |
| 9 | 29.872 | 6.58 | | |

TABLE 3-continued (Third Embodiment)

| | | | | |
|---|---|---|---|---|
| 10 | −54.561 | 4.00 | 25.4 | 1.80518 |
| 11 | 42.094 | 0.90 | | |
| 12 | 59.400 | 7.00 | 45.4 | 1.79668 |
| 13 | −26.251 | 0.10 | | |
| 14 | 50.500 | 3.50 | 45.4 | 1.79668 |
| 15 | 83.316 | ($d_{15}$) | | |
| 16 | −330.000 | 5.50 | 35.5 | 1.59507 |
| 17 | −38.900 | 3.00 | | |
| 18 | −36.902 | 2.50 | 45.4 | 1.79668 |
| 19 | −188.945 | (Bf) | | |

| | f = 51.6000 | β = −0.5000 | β = −1.0000 |
|---|---|---|---|
| D0 | ∞ | 106.5899 | 64.8514 |
| $d_2$ | 43.6518 | 23.3212 | 3.7920 |
| $d_{15}$ | 3.1392 | 23.4698 | 42.9990 |
| Bf | 44.6771 | 44.6771 | 44.6771 |

TABLE 4

(Fourth Embodiment)

| No | r | d | ν | n |
|---|---|---|---|---|
| 1 | ∞ | 10.00 | 64.1 | 1.51680 |
| 2 | ∞ | ($d_2$) | | |
| 3 | 202.590 | 4.50 | 50.2 | 1.72000 |
| 4 | 43.723 | 17.00 | | |
| 5 | 76.122 | 10.00 | 45.4 | 1.79668 |
| 6 | −209.639 | 0.10 | | |
| 7 | 53.452 | 13.00 | 47.1 | 1.67003 |
| 8 | 190.000 | 3.00 | | |
| 9 | −1300.000 | 5.00 | 31.1 | 1.68893 |
| 10 | 42.483 | 14.00 | | |
| 11 | −105.612 | 3.00 | 30.0 | 1.69895 |
| 12 | 81.000 | 11.00 | 53.7 | 1.69350 |
| 13 | −51.561 | 0.10 | | |
| 14 | 93.206 | 9.00 | 47.1 | 1.67003 |
| 15 | 614.597 | ($d_{15}$) | | |
| 16 | 218.999 | 10.00 | 35.5 | 1.59507 |
| 17 | −89.748 | 3.50 | | |
| 18 | −89.393 | 3.00 | 49.4 | 1.77279 |
| 19 | 51.406 | 12.50 | | |
| 20 | 59.061 | 12.50 | 46.4 | 1.58267 |
| 21 | 300.002 | (Bf) | | |

| | f = 105.0000 | β = −0.5000 | β = −1.0000 |
|---|---|---|---|
| D0 | ∞ | 254.8716 | 150.6073 |
| $d_2$ | 56.6906 | 29.9049 | 3.1192 |
| $d_{15}$ | 2.6981 | 29.4838 | 56.2695 |
| Bf | 60.1181 | 60.1181 | 60.1181 |

Although the refractive index $n_w$ and Abbe number $\nu_w$ of water which is the object field medium are $n_2 = 1.3306$ and $\nu_w = 53.98$, respectively, the lens system of each embodiment is not restricted to water as the object field medium, but of course is also applicable to seawater, ethyl alcohol, etc.

The focal lengths of the entire system and respective lens units during infinity focusing when the object field medium in each embodiment is water will be shown in Table 5 below.

TABLE 5

| Embodiment | f | $f_1$ | $f_{2F}$ | $f_{2b}$ | $f_2$ | $f_3$ | $f_{23}$ | $f_4$ |
|---|---|---|---|---|---|---|---|---|
| 1 | 51.600 | Infinity | −46.661 | 54.142 | −419.395 | 43.876 | 44.073 | −214.140 |
| 2 | 51.600 | Infinity | −45.219 | 44.773 | 500.000 | 50.000 | 44.723 | −216.913 |
| 3 | 51.600 | 1000.000 | −38.541 | 46.245 | −362.419 | 45.191 | 44.073 | −318.417 |
| 4 | 105.000 | Infinity | −78.369 | 76.278 | −4077.866 | 71.307 | 75.000 | −224.595 |

Values correspond the conditional expressions in each embodiment will not be shown in Table 6 below.

TABLE 6

| Embodiment | $f_{2F}/f$ | $f_{23}/f$ | $d/f_{23}$ | $f/f_2$ | $q_{2F}$ | $n_{2F}$ | $f/f_1$ |
|---|---|---|---|---|---|---|---|
| 1 | −0.904 | 0.854 | 0.977 | −0.123 | −2.857 | 1.767 | 0 |
| 2 | −0.876 | 0.867 | 0.953 | 0.103 | −2.511 | 1.767 | 0 |
| 3 | −0.747 | 0.854 | 0.991 | −0.142 | −2.235 | 1.767 | 0.052 |
| 4 | −0.746 | 0.714 | 0.756 | 0.026 | −1.550 | 1.720 | 0 |

In any of the above-described embodiments, a very good imaging state is maintained from the infinity focused state to one-to-one magnification state.

When in each embodiment, focusing is to be effected from infinity to a close distance, the second lens unit G2 and the third lens unit G3 are moved together on the optical axis toward the object side, but it is also possible to move the fourth lens unit G4 relative to the image plane independently of the second lens unit G2 and the third lens unit G3 to thereby accomplish focusing.

As described above, according to the present invention, there is provided a lens for an underwater camera a which is capable of photographing underwater over a wide range form infinity to a close distance of the order of one-to-one magnification and has a high imaging performance and can be focused by a simple lens moving mechanism.

What is claimed is:

1. A photo-taking lens for an underwater camera including, in succession from the object side;

a first lens unit having no refractive power or having weak positive or negative refractive power and fixed relative to the image plane;

a second lens unit comprising a forward unit having negative refractive power and a rearward unit having positive refractive power, and having weak positive or negative refractive power as a whole;

a third lens unit having positive refractive power; and a fourth lens unit having negative refractive power;

said second lens unit and said third lens unit being designed to be moved together along the optical axis for the focusing from infinity to a close distance so that the on-axis air space between said first lens unit and said second lens unit is reduced and the on-axis air space between said third lens unit and said fourth lens unit is enlarged.

2. A photo-taking lens for an underwater camera according to claim 1, wherein when the focal length of said forward unit in said second lens unit is $f_{2F}$ and the combined focal length of said second lens unit and said third lens unit is $f_{23}$, said second lens unit and said third lens unit are designed to satisfy the following conditions:

$$31 < f_{2F}/f < -0.6$$

$$0.6 < f_{23}/f < 1,$$

where f : the rearward focal length of the entire system during infinity focusing when the object field medium is water.

3. A photo-taking lens for an underwater camera according to claim 1, wherein when the on-axis air space between said first lens unit and said second lens unit in an infinity focused state is d and the combined focal length of said second lens unit and said third lens unit is $f_{23}$, said second lens unit and said third lens unit are designed to satisfy the following condition:

$$0.3 < d/f_{23} < 2.0.$$

4. A photo-taking lens for an underwater camera according to claim 1, wherein when the focal length of said second lens unit is $f_2$, said second lens unit is designed to satisfy the following condition:

$$-0.7 < f/f_2 < 0.2,$$

where f : the rearward focal length of the entire system during infinity focusing when the object field medium is water.

5. A photo-taking lens for an underwater camera according to claim 1, wherein said forward unit in said second lens unit is comprised of a negative lens which satisfies the following conditions:

$$-3 < q_{2F} < -1, \ 1.65 < n_{2F},$$

where $q_{2F}$ : the shape factor of the negative lens constituting the forward unit in said second lens unit, $q_{2F} = (r_2 + r_1)/(r_2 - r_1)$ $r_1$ : the radius of curvature of the object side of the negative lens in the forward unit, $r_2$ : the radius of curvature of the image side of the negative lens in the forward unit, $n_{2F}$ : the refractive index of the negative lens constituting the forward unit in the second lens unit.

6. A photo-taking lens for an underwater camera according to claim 1, wherein the focal length of said first lens unit, when the object field medium is water, is $f_1$ and the rearward focal length of the entire system during infinity focusing when the object field medium is water, is f, and said first lens unit is designed to satisfy the following condition:

$$-0.25 < f/f_1 < 0.25.$$

7. A photo-taking lens for an underwater camera according to claim 1, wherein said first lens unit is comprised of a transparent parallel flat plate, said second lens unit is comprised of a forward unit which is a negative meniscus lens having its convex surface facing the object side, and a rearward unit comprising a positive meniscus lens having its convex surface facing the object side, a biconvex positive lens and a biconcave negative lens cemented to said positive lens, said third lens unit comprises a biconcave negative lens, a positive lens and a positive meniscus lens having its convex surface facing the object side, and said fourth lens unit is comprised of a positive lens having its surface of sharper curvature facing the image side, and a negative lens having its surface of sharper curvature facing the object side.

8. A photo-taking lens for an underwater camera according to claim 1, wherein said first lens unit is comprised of a positive meniscus lens having its convex surface facing the object side, said second lens unit is comprised of a forward unit which is a negative meniscus lens having its convex surface facing the object side, and a rearward unit comprising a positive meniscus lens having its convex surface facing the object side, a biconvex positive lens and a biconcave negative lens cemented to said positive lens, said third lens unit comprises a biconcave negative lens, a positive lens and a positive meniscus lens having its convex surface facing the object side, and said fourth lens unit is comprised of a positive lens having its surface of sharper curvature facing the image side, and a negative lens having its surface of sharper curvature facing the object side.

9. A photo-taking lens for an underwater camera according to claim 1, wherein said first lens unit is comprised of a transport parallel flat plate, said second lens unit is comprised of a forward unit which is a negative meniscus lens having its convex surface facing the object side, and a rearward unit comprising a biconvex positive lens, a positive meniscus lens having its convex surface facing the object side, and a negative lens having its concave surface of sharper curvature facing the image side, said third lens unit comprises a biconcave negative lens, a positive lens cemented to said negative lens, and a positive meniscus lens having its convex surface facing the object side, and said fourth lens unit is comprised of a positive lens, a biconcave negative lens and a positive meniscus lens having its surface of sharper curvature facing the object side.

10. A photo-taking lens for an underwater camera according to claim 1, which is designed in accordance with the following data:

| No | r | d | ν | n |
|---|---|---|---|---|
| 1 | ∞ | 10.00 | 64.1 | 1.51680 |
| 2 | ∞ | ($d_2$) | | |
| 3 | 35.336 | 3.50 | 46.8 | 1.76684 |
| 4 | 17.014 | 9.00 | | |
| 5 | 31.805 | 3.50 | 25.4 | 1.80518 |
| 6 | 71.705 | 0.10 | | |
| 7 | 36.369 | 5.00 | 45.4 | 1.79668 |
| 8 | −72.941 | 2.00 | 29.5 | 1.71736 |
| 9 | 32.415 | 8.84 | | |
| 10 | −55.010 | 2.50 | 23.0 | 1.86074 |
| 11 | 71.364 | 0.70 | | |
| 12 | 222.194 | 7.30 | 45.4 | 1.79668 |
| 13 | −24.641 | 0.10 | | |
| 14 | 35.473 | 3.50 | 40.9 | 1.79631 |
| 15 | 55.180 | ($d_{15}$) | | |
| 16 | 259.906 | 6.00 | 40.3 | 1.60717 |
| 17 | −33.230 | 1.70 | | |
| 18 | −31.796 | 2.00 | 45.4 | 1.79668 |
| 19 | 664.600 | (Bf) | | |

| | f = 51.6000 | β = −0.5000 | β = −1.0000 |
|---|---|---|---|
| D0 | ∞ | 108.4613 | 64.7658 |
| $d_2$ | 43.0605 | 24.2389 | 5.4172 |
| $d_{15}$ | 4.4407 | 23.2623 | 42.0840 |
| Bf | 45.0470 | 45.0470 | 45.0470 | where the numbers at the left and represent the order from the object side, r represents the radius of curvature of each lens surface, d represents the spacing between adjacent lens surfaces, ν represents Abbe number, n represents the refractive index for d line (λ=587.6 nm), f represents the focal length of the entire system, DO represents the distance from the object to be photographed to the first surface of the lens, and β represents the short distance photographing magnification.

11. A photo-taking lens for an underwater camera according to claim 1, which is designed in accordance with the following data:

| No | r | d | ν | n |
|---|---|---|---|---|
| 1 | ∞ | 8.00 | 64.1 | 1.51680 |
| 2 | ∞ | ($d_2$) | | |
| 3 | 43.499 | 3.00 | 46.8 | 1.76684 |
| 4 | 18.717 | 9.00 | | |
| 5 | 33.011 | 3.00 | 31.6 | 1.75692 |
| 6 | 98.598 | .10 | | |
| 7 | 30.127 | 4.50 | 45.4 | 1.79668 |
| 8 | −300.000 | 2.00 | 33.7 | 1.64831 |
| 9 | 27.511 | 9.49 | | |
| 10 | −47.134 | 3.00 | 25.4 | 1.80518 |
| 11 | 39.212 | 1.20 | | |
| 12 | 54.978 | 7.00 | 45.4 | 1.79668 |
| 13 | −28.357 | 0.10 | | |
| 14 | 74.480 | 3.50 | 49.4 | 1.77279 |
| 15 | 416.366 | ($d_{15}$) | | |
| 16 | 120.000 | 5.50 | 38.0 | 1.60342 |
| 17 | −39.037 | 2.00 | | |
| 18 | −36.689 | 2.00 | 45.4 | 1.79668 |
| 19 | 171.930 | (Bf) | | |

| | f = 51.6000 | β = −0.5000 | β = −1.0000 |
|---|---|---|---|
| D0 | ∞ | 112.0831 | 69.1333 |
| $d_2$ | 42.6244 | 23.2434 | 3.8624 |
| $d_{15}$ | 2.3912 | 21.7722 | 41.1532 |
| Bf | 45.8116 | 45.8116 | 45.8116 | where the numbers at the left end represents the order from the object side, r represents the radius of curvature of each lens surface, d represents the spacing between adjacent lens surfaces, ν represents Abbe number, n represents the refractive index for d line (λ=587.6 nm), f represents the focal length of the entire system, DO represents the distance from the object to be photographed to the first surface of the lens, and β represents the short distance photographing magnification.

12. A photo-taking lens for an underwater camera according to claim 1, which is designed in accordance with the following data:

| No | r | d | ν | n |
|---|---|---|---|---|
| 1 | 95.000 | 10.00 | 64.1 | 1.51680 |
| 2 | 546.202 | ($d_2$) | | |
| 3 | 45.280 | 3.50 | 46.8 | 1.76684 |
| 4 | 17.283 | 9.20 | | |
| 5 | 31.900 | 5.00 | 25.4 | 1.80518 |
| 6 | 135.668 | 0.10 | | |
| 7 | 35.200 | 4.80 | 49.4 | 1.77279 |
| 8 | −100.000 | 2.00 | 28.3 | 1.72825 |
| 9 | 29.872 | 6.58 | | |
| 10 | −54.561 | 4.00 | 25.4 | 1.80518 |
| 11 | 42.094 | 0.90 | | |
| 12 | 59.400 | 7.00 | 45.4 | 1.79668 |
| 13 | −26.251 | 0.10 | | |
| 14 | 50.500 | 3.50 | 45.4 | 1.79668 |
| 15 | 83.316 | ($d_{15}$) | | |
| 16 | −330.000 | 5.50 | 35.5 | 1.59507 |
| 17 | −38.900 | 3.00 | | |
| 18 | −36.902 | 2.50 | 45.4 | 1.79668 |
| 19 | −188.945 | (Bf) | | |

| | f = 51.6000 | β = −0.5000 | β = −1.0000 |
|---|---|---|---|
| D0 | ∞ | 106.5899 | 64.8514 |
| $d_2$ | 43.6518 | 23.3212 | 3.7920 |
| $d_{15}$ | 3.1392 | 23.4698 | 42.9990 |
| Bf | 44.6771 | 44.6771 | 44.6771 | where the numbers at the left end represent the order from the object side, r represents the radius of curvature of each lens surface, d represents the spacing between adjacent lens surfaces, ν represents Abbe number, n represents the refractive index for a d line (λ=587.6 nm), f represents the focal length of the entire system, DO represents the distance from the object to be photographed to the first surface of the lens, and β represents the short distance photographing magnification.

13. A photo-taking lens for an underwater camera according to claim 1, which is designed in accordance

| No | r | d | ν | n |
|---|---|---|---|---|
| 1 | ∞ | 10.00 | 64.1 | 1.51680 |
| 2 | ∞ | (d₂) | | |
| 3 | 202.590 | 4.50 | 50.2 | 1.72000 |
| 4 | 43.723 | 17.00 | | |
| 5 | 76.122 | 10.00 | 45.4 | 1.79668 |
| 6 | −209.639 | 0.10 | | |
| 7 | 53.452 | 13.00 | 47.1 | 1.67003 |
| 8 | 190.000 | 3.00 | | |
| 9 | −1300.000 | 5.00 | 31.1 | 1.68893 |
| 10 | 42.483 | 14.00 | | |
| 11 | −105.612 | 3.00 | 30.0 | 1.69895 |
| 12 | 81.000 | 11.00 | 53.7 | 1.69350 |
| 13 | −51.561 | 0.10 | | |
| 14 | 93.206 | 9.00 | 47.1 | 1.67003 |
| 15 | 614.597 | (d₁₅) | | |
| 16 | 218.999 | 10.00 | 35.5 | 1.59507 |
| 17 | −89.748 | 3.50 | | |
| 18 | −89.393 | 3.00 | 49.4 | 1.77279 |
| 19 | 51.406 | 12.50 | | |
| 20 | 59.061 | 12.50 | 46.4 | 1.58267 |
| 21 | 300.002 | (Bf) | | |

| | f = 105.0000 | β = −0.5000 | β = −1.0000 |
|---|---|---|---|
| D0 | ∞ | 254.8716 | 150.6073 |
| d₂ | 56.6906 | 29.9049 | 3.1192 |
| d₁₅ | 2.6981 | 29.4838 | 56.2695 |
| Bf | 60.1181 | 60.1181 | 60.1181 | where he numbers at the left end represent the order from the object side, r represents the radius of curvature of each lens surface, d represents the spacing between adjacent lens surfaces, $\nu$ represents Abbe number, n represents the refractive index for d line ($\lambda = 587.6$ nm), f represents the focal length of the entire system, DO represents the distance from the object to be photographed to the first surface of the lens, and $\beta$ represents the short distance photographing magnification.

* * * * *